US008312544B2

(12) United States Patent
Tripathi et al.

(10) Patent No.: US 8,312,544 B2
(45) Date of Patent: Nov. 13, 2012

(54) METHOD AND APPARATUS FOR LIMITING DENIAL OF SERVICE ATTACK BY LIMITING TRAFFIC FOR HOSTS

(75) Inventors: Sunay Tripathi, Palo Alto, CA (US);
Nicolas G. Droux, San Jose, CA (US);
Yuzo Watanabe, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 353 days.

(21) Appl. No.: 12/611,467

(22) Filed: Nov. 3, 2009

(65) Prior Publication Data

US 2010/0122346 A1    May 13, 2010

Related U.S. Application Data

(63) Continuation of application No. 11/112,328, filed on Apr. 22, 2005, now Pat. No. 7,640,591.

(51) Int. Cl.
*G06F 9/00*    (2006.01)
*G06F 11/00*    (2006.01)
(52) U.S. Cl. .................. 726/23; 726/11; 726/13; 726/22
(58) Field of Classification Search .............. 726/11–14, 726/22–25; 709/223–229
See application file for complete search history.

(56) References Cited

U.S. PATENT DOCUMENTS

| | | | | |
|---|---|---|---|---|
| 6,829,217 B1 * | 12/2004 | Bechtolsheim et al. | ....... | 370/229 |
| 7,092,357 B1 * | 8/2006 | Ye | ................... | 370/230 |
| 7,219,239 B1 * | 5/2007 | Njemanze et al. | ................ | 726/3 |
| 7,603,458 B1 * | 10/2009 | Sexton et al. | ................. | 709/224 |
| 7,860,961 B1 * | 12/2010 | Finkelstein et al. | .......... | 709/223 |
| 2003/0097439 A1 * | 5/2003 | Strayer et al. | ................. | 709/224 |
| 2003/0120795 A1 * | 6/2003 | Reinshmidt | ................... | 709/232 |
| 2004/0199791 A1 * | 10/2004 | Poletto et al. | ................. | 713/201 |
| 2005/0138620 A1 * | 6/2005 | Lewites | ............................. | 718/1 |
| 2006/0085855 A1 * | 4/2006 | Shin et al. | ....................... | 726/23 |
| 2006/0174324 A1 * | 8/2006 | Zur et al. | .......................... | 726/3 |

* cited by examiner

*Primary Examiner* — Darren B Schwartz
(74) *Attorney, Agent, or Firm* — Osha Liang LLP

(57) ABSTRACT

A method for controlling a denial of service attack involves receiving a plurality of packets from a network, identifying an attacking host based on a severity level of the denial of service attack from the network, wherein the attacking host is identified by an identifying attack characteristic associated with one of the plurality of packets associated with the attacking host, analyzing each of the plurality of packets by a classifier to determine to which of a plurality of temporary data structures each of the plurality of packet is forwarded, forwarding each of the plurality of packets associated with the identifying attack characteristic to one of the plurality of temporary data structures matching the severity level of the denial of service attack as determined by the classifier, requesting a number of packets from the one of the plurality of temporary data structures matching the severity level by the virtual serialization queue, and forwarding the number of packets to the virtual serialization queue.

20 Claims, 6 Drawing Sheets

METHOD AND APPARATUS FOR LIMITING DENIAL OF SERVICE ATTACK BY LIMITING TRAFFIC FOR HOSTS

CROSS-REFERENCE TO RELATED APPLICATIONS

This application is a continuation of U.S. patent application Ser. No. 11/112,328, entitled: "METHOD AND APPARATUS FOR LIMITING DENIAL OF SERVICE ATTACK BY LIMITING TRAFFIC FOR HOSTS", and filed on Apr. 22, 2005. Further, this application claims benefit from U.S. patent application Ser. No. 11/112,328 under 35 U.S.C. §120, which is hereby incorporated by reference in its entirety.

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Hardware-Based Network Interface Per-Ring Resource Accounting" Ser. No. 11/112,222; "Dynamic Hardware Classification Engine Updating for a Network Interface" Ser. No. 11/112,934; "Network Interface Card Resource Mapping to Virtual Network Interface Cards" Ser. No. 11/112,063; "Network Interface Decryption and Classification Technique" Ser. No. 11/112,436; "Method and Apparatus for Enforcing Resource Utilization of a Container" Ser. No. 11/112,910; "Method and Apparatus for Enforcing Packet Destination Specific Priority Using Threads" Ser. No. 11/112,584; "Method and Apparatus for Processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DOS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks.

The Internet is entirely composed of limited resources. Such limited resources as bandwidth, processing power, and storage capacities are all common targets for DOS attacks designed to consume enough of a host's available resources to cause some level of service disruption. One reaction to DOS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of intrusion detection systems (IDS) to assist in defending against DOS attacks.

The primary responsibility of the IDS is to identify the attacking traffic based on traffic patterns and knowledge databases (i.e., databases maintaining historical data useful in recognizing or predicting patterns consistent with DOS attacks). IDS's continually become more sophisticated by using such techniques as rate limiting, packet filtering, and tweaking software parameters to help limit the impact of DOS attacks. As a result, the IDS can successfully identify the attacking network traffic and often the originating IP address (es). In most cases, the only defense is a reactive one where the source or sources of an ongoing attack are identified and prevented from continuing the attack. Nevertheless, the impacted resources and systems still suffer from the DOS attack and human intervention is required to take action based on a report generated by the IDS to potential fix the issues associated with the attack.

Recently, the use of source IP address spoofing during DOS attacks and the advent of distributed attack methods and tools have provided a constant challenge in the area of DOS attack prevention.

SUMMARY

In general, in one aspect, the invention relates to a method for controlling a denial of service attack. The method comprise receiving a plurality of packets from a network, identifying an attacking host based on a severity level of the denial of service attack from the network, wherein the attacking host is identified by an identifying attack characteristic associated with one of the plurality of packets associated with the attacking host, analyzing each of the plurality of packets by a classifier to determine to which of a plurality of temporary data structures each of the plurality of packet is forwarded, forwarding each of the plurality of packets associated with the identifying attack characteristic to one of the plurality of temporary data structures matching the severity level of the denial of service attack as determined by the classifier, requesting a number of packets from the one of the plurality of temporary data structures matching the severity level by the virtual serialization queue, wherein the virtual serialization queue is associated with the one of the plurality of temporary data structures matching the severity level, and forwarding the number of packets to the virtual serialization queue.

In general, in one aspect, the invention relates to a system for controlling a denial of service attack. The system comprises a network interface configured to receive a plurality of packets from a network, an intrusion detection system configured to identify an attacking host based on a severity level of the denial of service attack from the network, wherein the attacking host is identified by an identifying attack characteristic associated with one of the plurality of packets, a classifier operatively connected to the network interface configured to analyze each of the plurality of packets and determine to which of a plurality of temporary data structures each of the plurality of packet is forwarded, the plurality of temporary data structures configured to receive each of the plurality of packets associated with the identifying attack characteristic, wherein one of the plurality of temporary data structures matches the severity level of the denial of service attack as determined by the classifier and is associated with at least one virtual serialization queue, and the at least one virtual serialization queue, wherein the at least one virtual serialization queue is configured to retrieve and queue a number of packets from the one of the plurality of temporary data structures associated with the at least one virtual serialization queue based on the severity level.

Other aspects of the invention will be apparent from the following description and the appended claims.

DETAILED DESCRIPTION

Figure 1A:
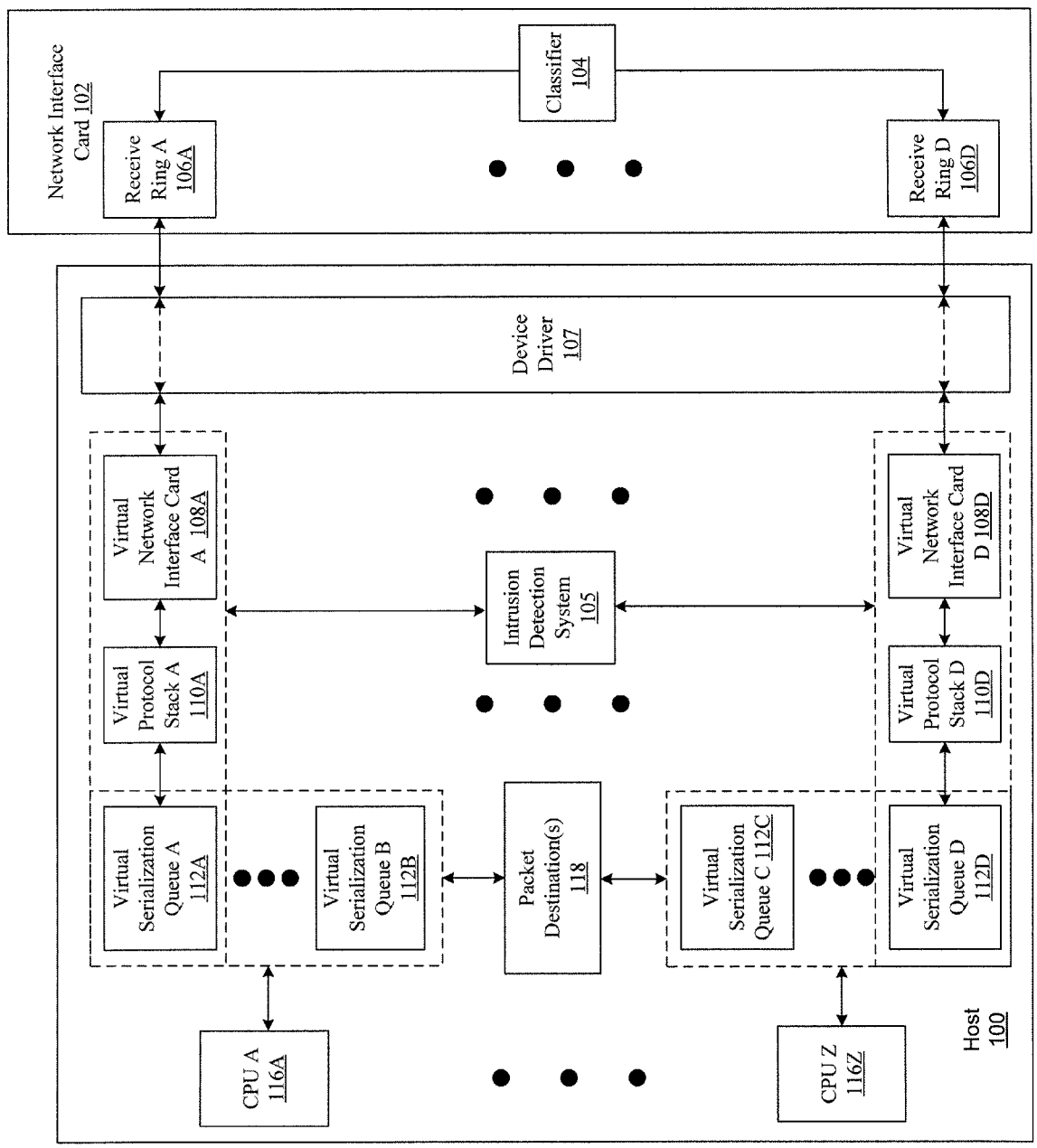
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for limiting DOS attacks by limiting network traffic from originating hosts (i.e., sending systems) to the receiving systems. More specifically, embodiments of the invention relate to a method and apparatus for enforcing network resource utilization of a service.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. In one embodiment of the invention, the classifier (104) is able to arbitrarily move connections to any temporary data structure (i.e., receive ring (106A, 106D)) based on the fields in each packet. In one embodiment of the invention, the classifier (104) is capable of being dynamically programmed to forward packets coming from an identified denial of service attack to a particular temporary data structure, such as receive ring (106A, 106D), based on a severity level associated with a denial of service attack.

The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: an intrusion detection system (105), a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destination(s) (118) (e.g., services, containers, etc.).

In one embodiment of the invention, the intrusion detection system (105) is similar to intrusion detection systems well known in the art. However, the intrusion detection system (105) may be modified to dynamically interact with the kernel and internet protocol stack associated with the host (100). These modifications allow the intrusion detection system (105) to inform the kernel about an identifying attack characteristic (e.g., an internet protocol address, a unique field within the packet header, etc.) of the attacking host along with a severity level of the attack. In one embodiment of the invention, the severity level may be quantified as an integer value in a range from 1 to 10, with the higher number indicating a more severe attack or as a percentage of severity. The kernel then instructs the internet protocol stack to program the classifier (104) to forward packets (as discussed above). Accordingly, the packets associated with the attacking host are forwarded to receive rings and eventually the associated virtual network stack matching the severity level of the attack. Accordingly, the impact from the network traffic associated with the attack is controlled to result in the performance of the overall system and services on the system to have minimal impact on the non-attack packet destinations even when under a DOS attack.

In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various packet destination (118) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types of the attacking host. Thus, while the host (100) may be operatively connected to a single NIC (102), a packet destination (118) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destination (118). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

Figure 1B:
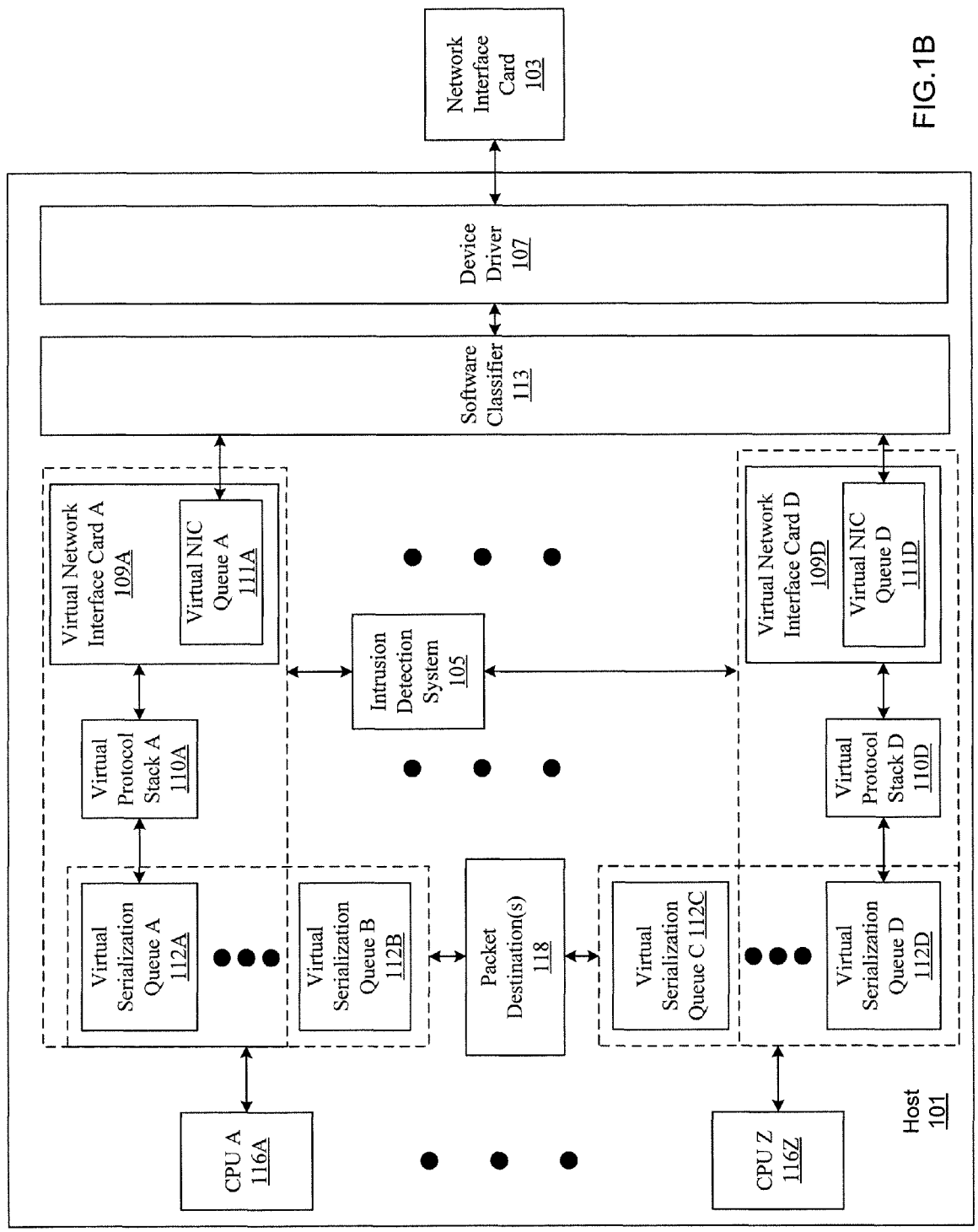

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes a Network Interface (NI) (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: an intrusion detection system (105), a device driver (107), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one or more packet destination (118). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded. In one embodiment of the invention, the software classifier (113) is able to arbitrarily move connections to any temporary data structure (i.e., receive ring (106A, 106D)) based on the fields in each packet. In one embodiment of the invention, the software classifier (113) is capable of being dynamically programmed to forward packets coming from an identified denial of service attack to a particular temporary data structure, such as receive ring (106A, 106D), based on a severity level associated with a denial of service attack.

In one embodiment of the invention, the intrusion detection system (105) is similar to intrusion detection systems well known in the art. However, the intrusion detection system (105) may be modified to dynamically interact with the kernel and internet protocol stack associated with the host (100). These modifications allow the intrusion detection system (105) to inform the kernel about an identifying attack characteristic (e.g., an internet protocol address, a unique field within the packet header, etc.) of the attacking host along with a severity level of the attack. In one embodiment of the invention, the severity level may be quantified as an integer value in a range from 1 to 10, with the higher number indicating a more severe attack or as a percentage of severity. The kernel then instructs the internet protocol stack to program the software classifier (113) to forward packets (as discussed above). Accordingly, the packets associated with the attacking host are forwarded to receive rings (not shown) and eventually the associated virtual network stack matching the severity level of the attack. Accordingly, the impact from the network traffic associated with the attack is controlled to result in the performance of the overall system and services on the system (i.e., the non-attacked packet destinations) to have minimal impact even when under a DOS attack.

Continuing with FIG. 1B, the device driver (107) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destination (118) executing on the host (101). More specifically, each virtual NIC (109A, 109D) operates like a NIC (103). For example, in one embodiment of the invention, each virtual NIC (109A, 109D) is associated with one or more IP addresses, one or more ports, and configured to handle one or more protocol types of the attacking host. Thus, while the host (101) may be operatively connected to a single NIC (103), the host (101) (or more specifically, packet destinations (118) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, in FIGS. 1A and 1B, the host (100, 101) includes one or more packet destinations (118). In one or more embodiments of the invention, each packet destinations (118) provides an isolated environment for running applications. Processes running in a given container are prevented from monitoring or interfering with other activities in the system. Access to other processes, network interfaces, file systems, devices, and inter-process communication facilities is restricted to prevent interaction between processes in different container. The privileges available within a container are restricted to prevent operations with system-wide impact.

In one embodiment of the invention, each packet destinations (118) may include functionality to support the following processes: per-container console, system log, packaging database, run level, identity (including name services), inter-process communication facility, etc. In addition, the host (100, 101) may include a set of administrative tools to manage the packet destination (118), allowing them to be configured, installed, patched, upgraded, booted, rebooted, and halted. As a result, packet destination (118) may be administered in a manner very similar to separate machines.

In one embodiment of the invention, a packet destination (118) may either be bound to a dedicated pool of resources (such as a number of CPUs, a quantity of physical memory, network resources), or can share resources with other packet destinations (118) according to defined proportions. This allows the use of container both on large systems (where dedicated resources may be most appropriate) and smaller ones (where a greater degree of sharing is necessary). Further, packet destination (118) also provide for the delegation of many of the expected administrative controls for using packet destinations (118). For example, because each container has its own name service identity, it also has its own notion of a password file and its own root user.

Continuing with the discussion of embodiments of the invention, in one embodiment of the invention, the receive rings and the virtual NIC queues may be generally referred to as temporary data structures. Further, in one embodiment of the invention, a system, as shown in FIGS. 1A and 1B, may include multiple hosts (such as host (100) in FIG. 1A and host (101) in FIG. 1B) where each host is operatively connected to one or more NICs. In one embodiment of the invention, each of the NICs may correspond to the NIC shown in FIG. 1A (i.e., NIC (102)) or the NIC shown in FIG. 1B (i.e., NIC (103)). Thus, in a given system, one host may include a software classifier (113) while another host may be connected to a NIC with a hardware classifier (104). In this scenario, the host (100, 101) would be configured to support both implementations, as described above with in FIGS. 1A and 1B.

Figure 2:
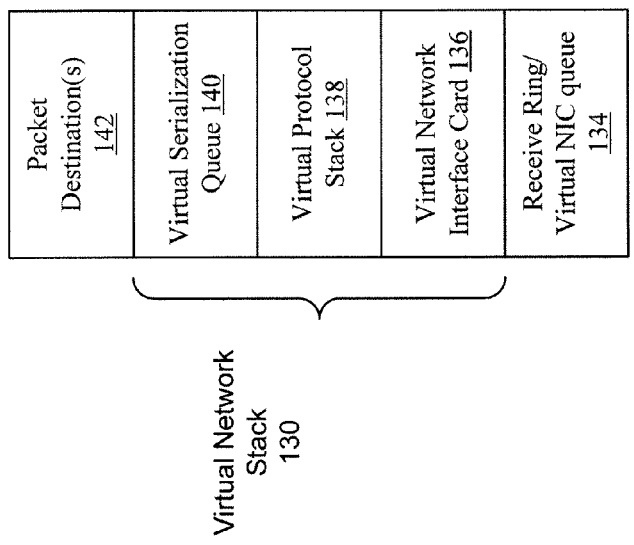
FIG. 2 shows a virtual network stack in accordance with one embodiment of the invention.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC queues (134) (depending on the implementation). Further, the virtual network stack (130) may be bound to one or more packet destinations (142). All of the aforementioned components in the virtual network stack (130) are bound together such that a packet received by the virtual NIC (136) of a particular virtual network stack (130) is forwarded through the other components of the virtual network stack (130) until the packet reaches the packet destination (142)) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
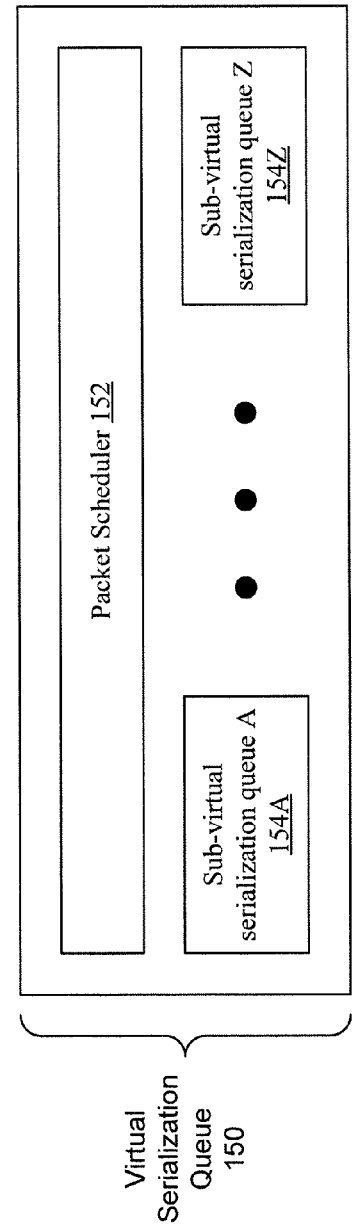
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) is bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, the packets are placed on a sub-virtual serialization queue (154A, 154Z) associated with a severity level of a denial of service attack launched by an attacking host. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (152) may include functionality to support both fair-share scheduling and time-sharing scheduling with respect to processing of the packets queued on the sub-virtual serialization queues (154A, 154Z). Further, the packet scheduler (152) may also be configured to schedule packet processing based on the priority associated with each of the sub-virtual serialization queues (154A, 154Z). In one embodiment of the invention, the priority level of a particular sub-virtual serialization queue (e.g., 154A, 154Z) is based on an attack control parameter, which is based on the severity of the denial of service attack.

Figure 4:
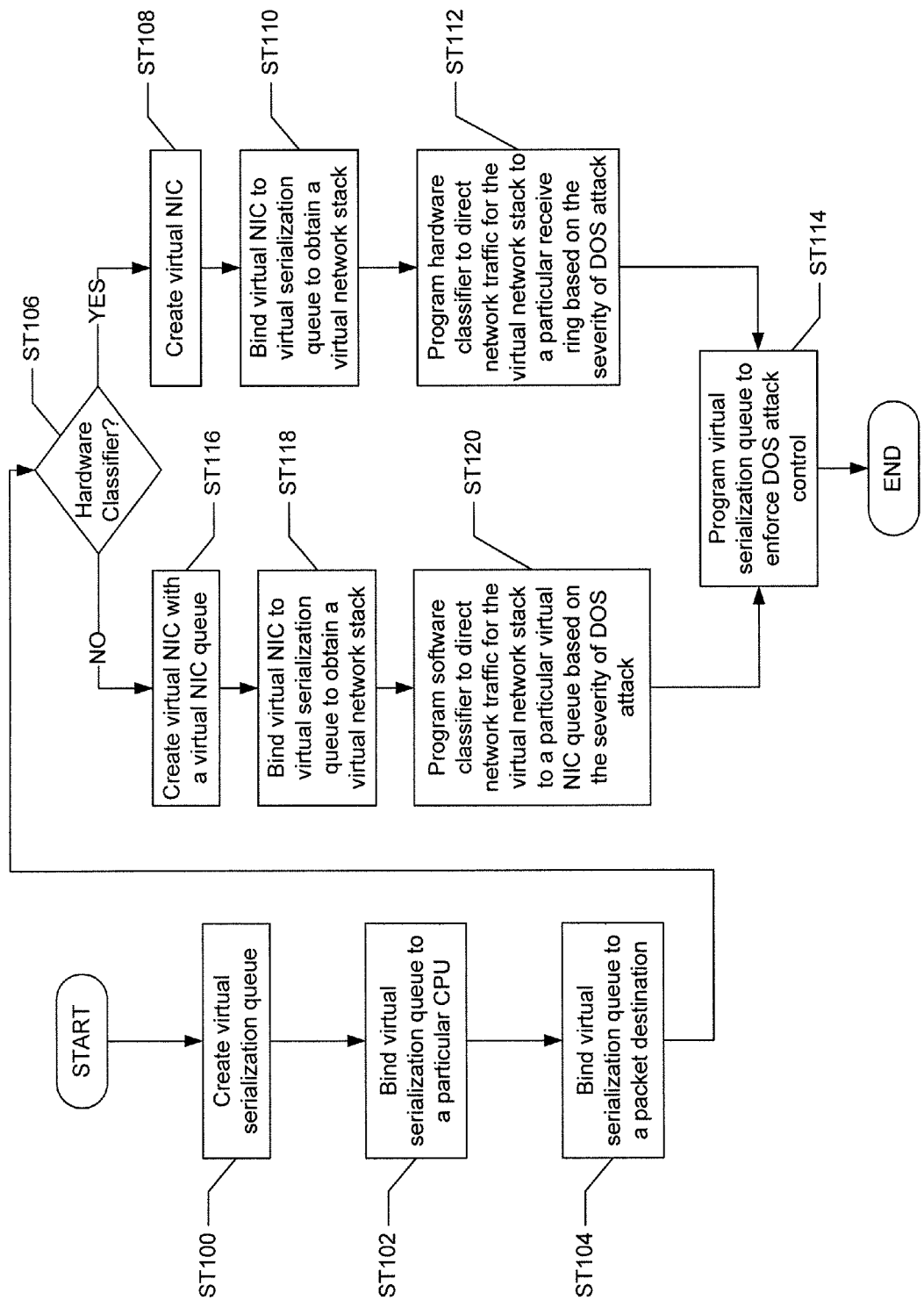
FIGS. 4 and 5 show flowcharts in accordance with one embodiment of the invention.

FIG. 4 shows a flowchart in accordance with one embodiment of the invention. Initially, a virtual serialization queue is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a packet destination (ST104). Those of ordinary skill in the art will appreciate that the packet destination (118) may be bound to the virtual serialization queue any time after the virtual serialization queue has been created.

A determination is now made whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). In one embodiment of the invention, the hardware classifier is programmed so that the network traffic is directed to a particular virtual NIC queue associated with a severity level of the denial of service attack by an attacking host.

The virtual serialization queue created in ST100 is programmed to enforce DOS attack control (ST114). In one embodiment of the invention, ST114 is optional. In one embodiment of the invention, programming the virtual serialization to enforce DOS attack control includes specifying an attack control parameter for the virtual serialization queue. In one embodiment of the invention, the attack control parameter specifies the maximum number of packets that may be processed by the virtual serialization queue over a specific time period (e.g., number of packets that may be processed by the specific virtual serialization queue per second) based on the severity level of the denial of service attack. Alternatively, the attack control parameter may specify the maximum number of bytes of data that may be processed by the virtual serialization queue in a specific time period based on the severity level of the denial of service attack.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). In one embodiment of the invention, the software classifier is modified to direct the network traffic to a particular virtual NIC queue associated with a severity level of the denial of service attack by an attacking host. The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
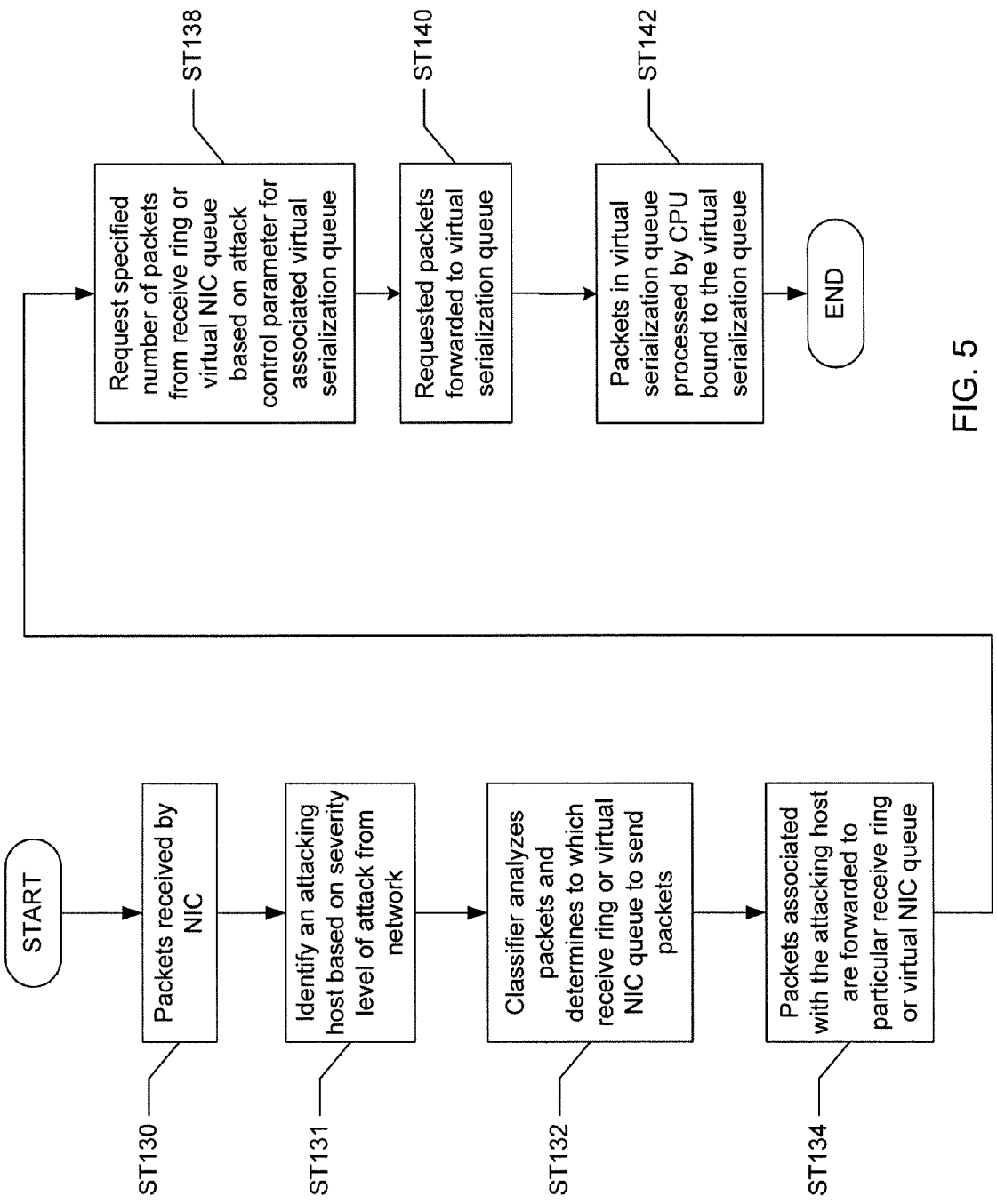

FIG. 5 shows a flowchart in accordance with one embodiment of the invention. Initially, one or more packets are received by the NIC (ST130). Next, an attacking host (if one exists) is identified based on severity level of attack from network (ST131). In one embodiment of the invention, an intrusion detection system, similar to intrusion detection systems well known in the art, is used to identify the attacking host. The intrusion detection system may be modified to dynamically interact with the kernel and internet protocol stack associated with the host. These modifications allow the intrusion detection system to inform the kernel about an identifying attack characteristic (e.g., an internet protocol address, a unique field within the packet header, etc.) of the attacking host along with a severity level of the attack. In one embodiment of the invention, the severity level may be quantified as an integer value in a range from 1 to 10, with the higher number indicating a more severe attack or as a percentage of severity. The kernel then instructs the internet protocol stack to program the classifier to forward packets (as discussed in ST132).

A classifier (either a hardware classifier residing in the NIC or a software classifier residing in the host operatively connected to the NIC) analyses each packet and determines which of the receive rings (if the classifier is a hardware classifier) or virtual NIC queues (if the classifier is a software classifier) to forward each of the packets (ST132). The packets are subsequently forwarded to the appropriate receive ring (if the classifier is a hardware classifier) or virtual NIC queue (if the classifier is a software classifier) as determined by the classifier (ST134). In one embodiment of the invention, the packets associated with the attacking host are forwarded to receive rings and eventually the associated virtual network stack matching the severity level of the attack.

At this stage, the packets remain in the receive ring or virtual NIC queue (depending on the implementation) until the virtual serialization queue requests a specified number of packets from the receive ring or virtual NIC queue based on the attack control parameter (ST138). The requested number of packets is then forwarded to the virtual serialization queue (ST140). Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132. Accordingly, the impact from the network traffic associated with the attack is controlled to result in the performance of the overall system and services on the system (i.e., the non-attacked packet destinations) to have minimal impact even when under a DOS attack.

Those skilled in the art will appreciate the virtual serialization queue may operate in polling mode without using an attack control parameter. Thus, if no attack control parameter is specified, then all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fills with packets and packets received after this point are dropped until packets on the receive rings and/or virtual NIC queues are requested and processed.

Once the packets are placed on the virtual serialization queue, the packets are processed by the CPU bound to the particular virtual serialization queue (ST142). In one embodiment of the invention, the specific order in which the packets in a particular sub-virtual serialization queue are processed is determined by the packet scheduler.

Figure 6:
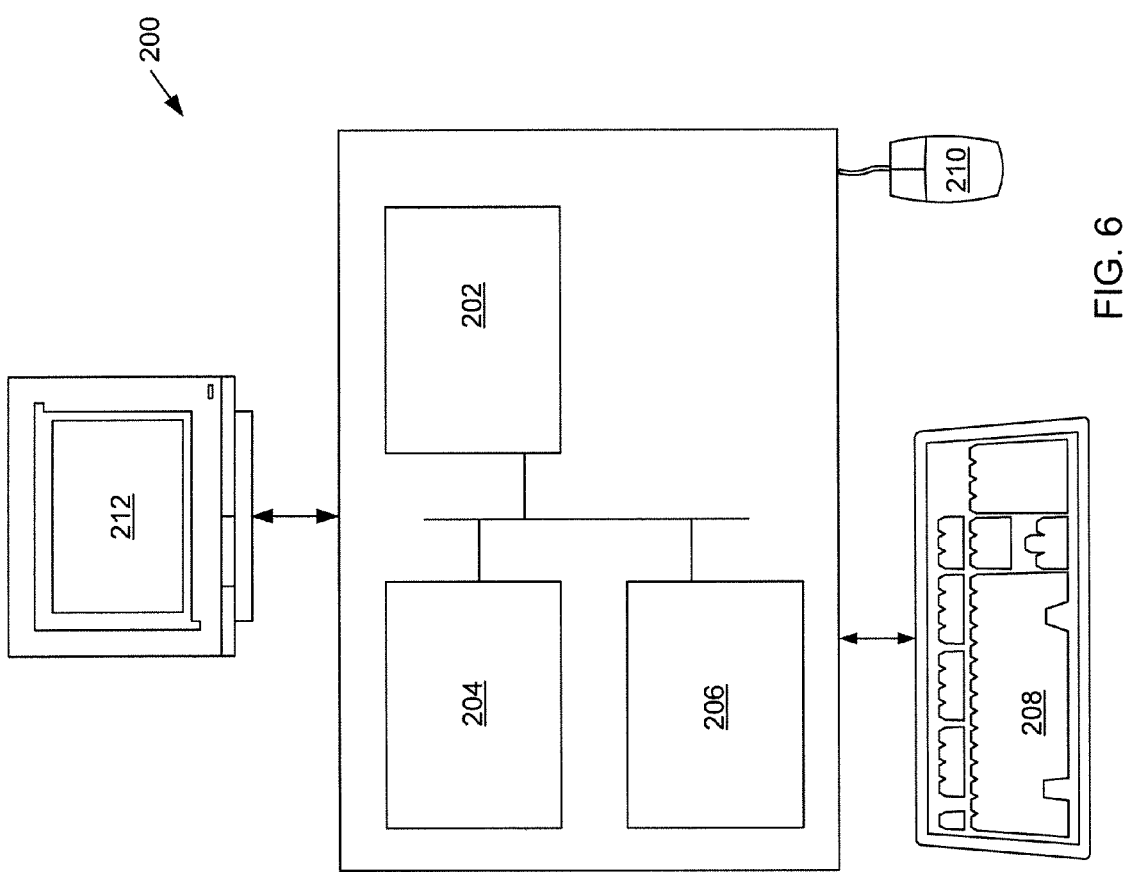
FIG. 6 shows a computer system in accordance with one embodiment of the invention.

An embodiment of the invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, or any other computer readable storage device.

In one embodiment of the invention, limiting the network traffic to the receiving system based on severity level of the attack, allows for better system and service performance under DOS attacks. Specifically, in one embodiment of the invention, programming the classifier to direct packets coming across the network from an identified IP address to a designated temporary data structure associated with a virtual network stack, performance may be maintained and critical services remain available without human intervention.

While the invention has been described with respect to a limited number of embodiments, those skilled in the art, having benefit of this disclosure, will appreciate that other embodiments and advantages can be devised which do not depart from the scope of the invention as disclosed herein. Accordingly, the scope of the invention should be limited only by the attached claims.

What is claimed is:

1. A method for controlling a denial of service attack on a host comprising:

receiving a plurality of packets from a network;

identifying an attacking host based on a severity level of the denial of service (DOS) attack from the network;

automatically re-configuring, in response to the identifying, a classifier to forward each of the plurality of packets associated with the attacking host to a temporary data structure associated with the severity level of the DOS attack, wherein the classifier is located on a physical network interface card operatively connected to the host, wherein the temporary data structure is one of a plurality of temporary data structures on the host, wherein each of the plurality of temporary data structures is associated with one of a plurality of severity levels, and wherein the attacking host is identified using an identifying attack characteristic;

identifying, using the classifier, each of the plurality of packets associated with the identifying attack characteristic by a classifier;

forwarding each of the identified plurality of packets associated with the identifying attack characteristic to the temporary data structure;

requesting, by the host, a number of packets from the temporary data structure matching the severity level to be placed in a virtual serialization queue, wherein the virtual serialization queue is associated with the temporary data structure, and wherein the temporary data structure comprises at least one receive ring;

forwarding the requested number of packets to the virtual serialization queue;

receiving, in response to forwarding the requested number of packets to the virtual serialization queue, at least one packet by the virtual serialization queue, wherein the at least one packet is placed in one of a plurality of sub-virtualization queues in the virtual serialization queue based on the temporary data structure from which the at least one packet was forwarded; and scheduling when to process the at least one packet using a packet scheduler in the virtual serialization queue, wherein the packet scheduler schedules the at least one packet based on a priority level associated with the one of the plurality of sub-virtualization queues in which the at least one packet is stored, wherein the priority level is associated with the severity level.

2. The method of claim 1, further comprising:
processing the at least one packet on the virtual serialization queue using a central processing unit bound to the virtual serialization queue.

3. The method of claim 1, wherein the number of packets is limited by an attack control parameter associated with the virtual serialization queue.

4. The method of claim 3, wherein the attack control parameter specifies a maximum number of packets that may be retrieved from the one of the plurality of temporary data structures associated with the virtual serialization queue in a specified period of time based on the severity level of the denial of service attack.

5. The method of claim 3, wherein the attack control parameter specifies a maximum number of bytes that may be retrieved from the one of the plurality of temporary data structures associated with the virtual serialization queue in a specified period of time based on the severity level of the denial of service attack.

6. The method of claim 1, wherein the classifier is one selected from a group consisting of a hardware classifier and a software classifier.

7. The method of claim 1, wherein forwarding the number of packets to the virtual serialization queue comprises:
forwarding the number of packets from the one of the plurality of temporary data structures to a virtual protocol stack associated with the virtual serialization queue and the severity level for processing of the number of packets to obtain processed packets; and
forwarding the processed packets from the virtual protocol stack to the virtual serialization queue.

8. A system for controlling a denial of service attack on a host, comprising:
a network interface configured to receive a plurality of packets from a network;
an intrusion detection system configured to identify an attacking host based on a severity level of the denial of service (DOS) attack from the network;
a classifier, comprising functionality to automatically reconfigure in response to identifying an attacking host and functionality to analyze and forward each of the plurality of packets associated with the attacking host to a temporary data structure associated with the severity level of the DOS attack, wherein the classifier is located on a physical network interface card that is operatively connected to the host, wherein the temporary data structure is one of a plurality of temporary data structures on the host, wherein each of the plurality of temporary data structures is associated with one of a plurality of severity levels, wherein the attacking host is identified using an identifying attack characteristic, and wherein the temporary data structure comprises at least one receive ring;

the plurality of temporary data structures configured to receive each of the plurality of packets associated with the identifying attack characteristic; and the at least one virtual serialization queue, wherein the at least one virtual serialization queue is configured to receive and queue a number of packets from the one of the plurality of temporary data structures associated with the at least one virtual serialization queue, wherein at least one packet of the number of packets is placed in one of a plurality of sub-virtualization queues in the virtual serialization queue based on the temporary data structure from which the at least one packet was forwarded, wherein the virtual serialization queue comprises a packet scheduler configured to schedule the at least one packet based on a priority level associated with the one of the plurality of sub-virtualization queues in which the at least one packet is stored, wherein the priority level is associated with the severity level.

9. The system of claim 8, wherein the at least one virtual serialization queue is associated with a packet destination.

10. The system of claim 9, wherein the packet destination is at least one selected from a group consisting of a container and a service.

11. The system of claim 8, wherein the number of packets is limited by an attack control parameter associated with the at least one virtual serialization queue.

12. The system of claim 11, the attack control parameter specifies a maximum number of packets that may be retrieved from the one of the plurality of temporary data structures associated with the virtual serialization queue in a specified period of time based on the severity level of the denial of service attack.

13. The system of claim 11, wherein the attack control parameter specifies a maximum number of bytes that may be retrieved from the one of the plurality of temporary data structures associated with the virtual serialization queue in a specified period of time based on the severity level of the denial of service attack.

14. The system of claim 8, wherein retrieving the number of packets by the at least one virtual serialization queue comprises:
forwarding the number of packets from the one of the plurality of temporary data structures to a virtual protocol stack associated with the virtual serialization queue and the severity level for processing of the number of packets to obtain processed packets; and
forwarding the processed packets from the virtual protocol stack to the virtual serialization queue.

15. A non-transitory computer readable storage medium comprising computer readable code for controlling a denial of service attack on a host, that, when executed by a processor, is configured to:
receive a plurality of packets from a network;
identify an attacking host based on a severity level of the denial of service (DOS) attack from the network;

automatically re-configure, in response to the identifying, a classifier to forward each of the plurality of packets associated with the attacking host to a temporary data structure associated with the severity level of the DOS attack, wherein the classifier is located on a physical network interface card operatively connected to the host, wherein the temporary data structure is one of a plurality of temporary data structures on the host, wherein each of the plurality of temporary data structures is associated with one of a plurality of severity levels, and wherein the attacking host is identified using an identifying attack characteristic;

identify, using the classifier, each of the plurality of packets associated with the identifying attack characteristic by a classifier;

forward each of the identified plurality of packets associated with the identifying attack characteristic to the temporary data structure;

request, by the host, a number of packets from the temporary data structure matching the severity level to be placed in a virtual serialization queue, wherein the virtual serialization queue is associated with the temporary data structure, and wherein the temporary data structure comprises at least one receive ring;

forward the requested number of packets to the virtual serialization queue;

receive, in response to forwarding the requested number of packets to the virtual serialization queue, at least one packet by the virtual serialization queue, wherein the at least one packet is placed in one of a plurality of sub-virtualization queues in the virtual serialization queue based on the temporary data structure from which the at least one packet was forwarded; and schedule when to process the at least one packet using a packet scheduler in the virtual serialization queue, wherein the packet scheduler schedules the at least one packet based on a priority level associated with the one of the plurality of sub-virtualization queues in which the at least one packet is stored, wherein the priority level is associated with the severity level.

16. The non-transitory computer readable storage medium of claim 15, wherein the computer readable code, when executed by the processor, is further configured to:
process the at least one packet on the virtual serialization queue using a central processing unit bound to the virtual serialization queue.

17. The non-transitory computer readable storage medium of claim 15, wherein the number of packets is limited by an attack control parameter associated with the virtual serialization queue.

18. The non-transitory computer readable storage medium of claim 17, wherein the attack control parameter specifies a maximum number of packets that may be retrieved from the one of the plurality of temporary data structures associated with the virtual serialization queue in a specified period of time based on the severity level of the denial of service attack.

19. The non-transitory computer readable storage medium of claim 17, wherein the attack control parameter specifies a maximum number of bytes that may be retrieved from the one of the plurality of temporary data structures associated with the virtual serialization queue in a specified period of time based on the severity level of the denial of service attack.

20. The non-transitory computer readable storage medium of claim 15, wherein the computer readable code, when executed by the processor, is configured to forward the number of packets to the virtual serialization queue is configured to:
forward the number of packets from the one of the plurality of temporary data structures to a virtual protocol stack associated with the virtual serialization queue and the severity level for processing of the number of packets to obtain processed packets; and
forward the processed packets from the virtual protocol stack to the virtual serialization queue.

* * * * *